US012071216B2

(12) United States Patent
Minarik et al.

(10) Patent No.: US 12,071,216 B2
(45) Date of Patent: Aug. 27, 2024

(54) MODULAR UNMANNED AERIAL VEHICLE CONNECTION SYSTEM HAVING INSERTABLE TABS

(71) Applicant: Insitu, Inc., Bingen, WA (US)

(72) Inventors: Greg Minarik, Brier, WA (US); Danny R. Nalley, Carnation, WA (US); Harold A. Brown, Carnation, WA (US); Joel M. Reiter, Carnation, WA (US)

(73) Assignee: Insitu, Inc., Bingen, WA (US)

( * ) Notice: Subject to any disclaimer, the term of this patent is extended or adjusted under 35 U.S.C. 154(b) by 305 days.

(21) Appl. No.: 17/467,885

(22) Filed: Sep. 7, 2021

(65) Prior Publication Data

US 2022/0119090 A1 Apr. 21, 2022

Related U.S. Application Data

(60) Provisional application No. 63/092,290, filed on Oct. 15, 2020.

(51) Int. Cl.
| | |
|---|---|
| *B64C 1/26* | (2006.01) |
| *B64C 39/02* | (2023.01) |
| *B64U 10/25* | (2023.01) |
| *B64U 30/10* | (2023.01) |
| *B64U 30/20* | (2023.01) |
| *B64U 50/13* | (2023.01) |

(52) U.S. Cl.
CPC .............. *B64C 1/26* (2013.01); *B64C 39/024* (2013.01); *B64U 10/25* (2023.01); *B64U 30/10* (2023.01); *B64U 30/20* (2023.01); *B64U 50/13* (2023.01)

(58) Field of Classification Search
CPC ......................................................... B64C 1/26
See application file for complete search history.

(56) References Cited

U.S. PATENT DOCUMENTS

| | | | | |
|---|---|---|---|---|
| 3,004,645 | A | * 10/1961 | Moul, Jr. | ................. B64C 1/26 244/131 |
| 3,228,335 | A | 1/1966 | Thompson | |
| 4,039,163 | A | * 8/1977 | Shorey | ...................... B64C 1/22 193/35 C |
| 8,894,004 | B1 | * 11/2014 | Scott | ...................... F42B 10/14 244/3.28 |
| 2002/0179778 | A1 | * 12/2002 | Pijaca | ..................... F42B 10/64 244/221 |

(Continued)

FOREIGN PATENT DOCUMENTS

| | | |
|---|---|---|
| CN | 106 005 369 B | 7/2018 |
| KR | 2001 0105435 A | 11/2011 |
| WO | 2014/058510 A2 | 4/2014 |

OTHER PUBLICATIONS

European Patent Office, European Search Report, issued in connection with Application No. 21192531.8, dated Feb. 3, 2022.

*Primary Examiner* — Jessica B Wong
(74) *Attorney, Agent, or Firm* — HANLEY, FLIGHT & ZIMMERMAN, LLC

(57) ABSTRACT

A modular unmanned aerial vehicle (UAV) connection system is disclosed. A disclosed example connection system for use with a UAV includes a tab extending from one of an aerodynamic body or a frame, and a slot to receive the tab, the slot positioned on another of the aerodynamic body or the frame, the tab to be inserted into the slot in a direction that is opposite to a direction of travel of the UAV.

20 Claims, 9 Drawing Sheets

(56) References Cited

U.S. PATENT DOCUMENTS

2007/0018033 A1* 1/2007 Fanucci ............. F42B 15/22
                                                    244/49
2016/0009363 A1  1/2016 Valasek et al.
2018/0086458 A1  3/2018 Sartorius et al.
2019/0168872 A1  6/2019 Grubb et al.

* cited by examiner

MODULAR UNMANNED AERIAL VEHICLE CONNECTION SYSTEM HAVING INSERTABLE TABS

RELATED APPLICATION

This patent claims the benefit under 35 U.S.C. § 119(e) to U.S. Provisional Application No. 63/092,290, titled "Modular Unmanned Aerial Vehicle Connection System," and filed on Oct. 15, 2020. U.S. Provisional Application No. 63/092, 290 is hereby incorporated by this reference in its entirety.

FIELD OF THE DISCLOSURE

This disclosure relates generally to aircraft and, more particularly, to a modular unmanned aerial vehicle connection system.

BACKGROUND

In recent years, unmanned aerial vehicles (UAVs) or drones have been used to fly significant distances to transport payloads (e.g., packages, supplies, equipment, etc.) or gather information.

SUMMARY

An example connection system for use with a UAV includes a tab extending from one of an aerodynamic body or a frame, and a slot to receive the tab, the slot positioned on another of the aerodynamic body or the frame, the tab to be inserted into the slot in a direction that is opposite of a direction of travel of the UAV.

An example method for coupling an aerodynamic body to a frame of a UAV includes aligning a tab extending from one of the aerodynamic body or the frame to a slot positioned on another of the aerodynamic body or the frame, placing the tab in the slot, and sliding the tab along the slot in a direction that is opposite of a direction of travel of the UAV to couple the aerodynamic body to the frame.

An example connector for use with an unmanned aerial vehicle (UAV) includes an oblong oval body on one of an aerodynamic body or a frame of the UAV, the oblong oval body to be received by a slot positioned on another of the aerodynamic body or the frame, the oblong oval body to be inserted into the slot in a direction that is opposite of a direction of travel of the UAV.

Figure 1:
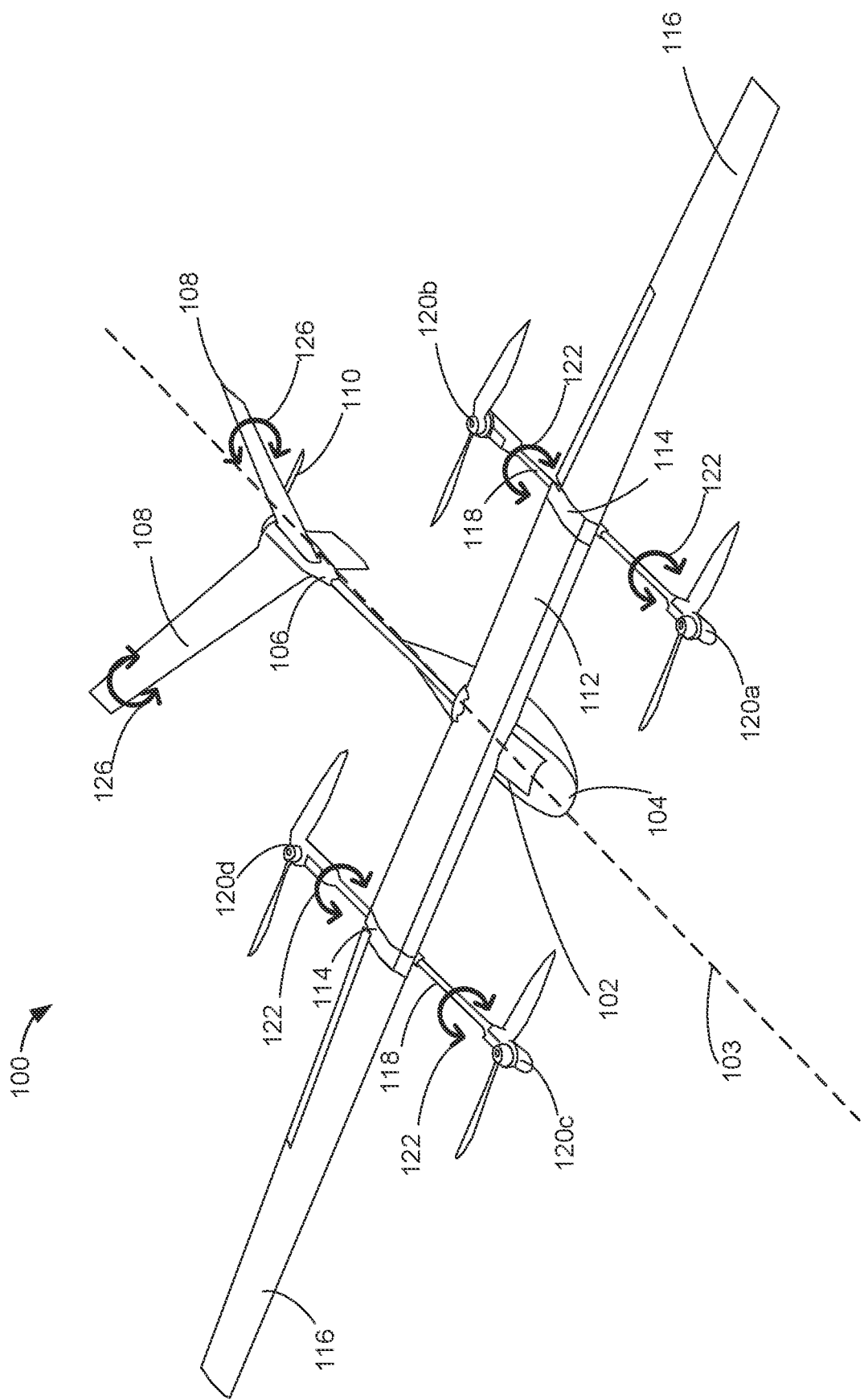
FIG. 1 is an example unmanned aerial vehicle (UAV) in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

A modular unmanned aerial vehicle (UAV) connection system is disclosed. Some known UAVs have a limited flight range based on weight (e.g., structural weight, fuel carried, payload, etc.), as well as aerodynamic design. Further, most known UAVs are designed for specific application needs (e.g., mission needs, payload requirements, etc.) and, thus, components of these known UAVs are not generally removable and/or replaceable (e.g., for shipping).

Examples disclosed herein enable UAVs that are lightweight, easy to store/ship, highly maneuverable, highly adaptable and relatively low cost. Examples disclosed herein enable different components to be replaced and/or swapped for different applications, thereby enabling the UAVs to be adapted for different uses. Examples, disclosed herein can be implemented to enable aerodynamic bodies, such as wings or rudder-elevators, to be interchangeable while supporting the aerodynamic bodies with sufficient strength for flight.

Examples disclosed herein include a connection system for use with a UAV. The connection system includes a tab extending from one of an aerodynamic body or a frame. The connection system also includes a slot to receive the tab. The slot is positioned on another of the aerodynamic body or the frame. Further, according to examples disclosed herein, the aforementioned tab is inserted into the slot along a direction that is opposite to a direction of travel of the UAV (e.g., within 5 degrees of an opposite direction from the direction of travel).

In some examples, a lock pin is implemented to capture the tab in the slot. In some such examples, the lock pin is spring-loaded. In some examples, the tab is wedge or dovetail shaped. In some examples, the aerodynamic body is a wing. In other examples, the aerodynamic body is a combined rudder-elevator.

As used herein, the term "releasably couplable" refers to an object that is intended to be coupled and released through numerous cycles with relatively little or no plastic deformation. Accordingly, the term "releasably couplable" can refer to a snap fit, a slip fit, a magnetic connection, a lock interface (e.g., a spring-loaded pin, a lever lock, etc.).

FIG. 1 is an example UAV 100 in which examples disclosed herein can be implemented. The UAV 100 is modular and adaptable to enable adjustments that can allow customization associated with different performance requirements. In particular, different components of the UAV 100 can be easily swapped to vary functionality of the UAV 100. Thus, the UAV 100 can be adapted for a wide range of application and/or flight needs.

The UAV 100 of the illustrated example includes a fuselage 102, which carries fuel and at least one payload. The fuselage 102 defines a longitudinal axis 103 and includes a controller 104. Further, the example fuselage 102 is operatively coupled to a tail boom 106 that supports rudder-elevators (e.g., a combined rudder and elevator, a combined rudder-elevator, etc.) 108, which are also known as ruddervators, and a tail motor 110. In the illustrated example, the fuselage 102 is coupled to a strongback or wing support frame 112 having respective distal ends 114. In this example, the distal ends 114 support releasably couplable wings 116, as well as booms (e.g., motor booms, wing booms, etc.) 118 that support motors 120 (hereinafter the motors 120a, 120b, 120c, 120d, etc.). In this example, the booms 118 extend generally parallel (e.g., within five degrees) to the aforementioned longitudinal axis 103 and do not support batteries and/or a power source for the motors 120a, 120b, 120c, 120d. Further, each of the booms 118 supports ones of the motors 120 at opposite sides of the strongback 112 and/or the corresponding wing(s) 116.

To move the UAV 100, the tail motor 110 of the illustrated example is controlled to propel the UAV 100 forward. Further, the motors 120a, 120b, 120c, 120d are operated to vary a lift of the UAV 100 during flight. For example, at least one of the motors 120a, 120b, 120c, 120d is operated to maneuver the UAV 100. In some examples, the motors 120a, 120b, 120c, 120d are utilized for hovering. Additionally or alternatively, the motors 120a, 120b, 120c, 120d are utilized for vertical takeoff, such as vertical take-off and landing (VTOL) or short take-off and landing (STOL) functionality.

To increase a maneuverability of the example UAV 100, the rudder-elevators 108 can be rotated, for example, as generally indicated by double arrows 126. Additionally or alternatively, an orientation of at least one of the motors 120a, 120b, 120c, 120d can be adjusted, as generally indicated by double arrows 122. In particular, in some such examples, the motors 120a, 120b, 120c, 120d are swiveled (e.g., swiveled independently of one another) during flight of the UAV 100.

To increase a range and fuel efficiency of the UAV 100, a wingspan of the UAV 100 can range from 4.85 m to 5.05 m (e.g., 4.95 m in length). In this example, the wingspan is defined as a distance between distal outer ends of the wings 116 and, thus, can include a width of the strongback 112. Further, a length of the fuselage can range from 2.03 m to 2.23 m (e.g., 2.13 m). These example dimensions can be advantageous in operating the UAV 100 in terms of fuel efficiency and range.

To enable the UAV 100 to be adaptable and facilitate shipping or storage of the UAV 100, the rudder-elevators 108 are releasably couplable to the fuselage 102 and/or the tail boom 106. Further, the wings 116 are releasably couplable to the strongback 112. In particular, the wings 116 can be exchanged, replaced and/or swapped for wings that are better suited for another application and/or mission requirement. For example, the wings 116 can be swapped with a shorter wing (i.e., a decreased wingspan) for faster flight or a longer wing (i.e., an increased wingspan) for gliding, thereby enabling a great degree of versatility of the UAV 100. In other words, different wings and/or rudder-elevators can be selected for different functions and/or performance requirements. As a result of this flexibility, an operator may purchase and maintain a reduced number of operational UAVs, thereby saving expenses and costs associated with a large fleet of UAVs. Moreover, the replaceability of the wings 116 enables a damaged wing or rudder-elevator to be replaced and, thus, increases a service life of the UAV 100. In some examples, the strongback 112 is releasably couplable to the fuselage 102.

In some examples, the booms 118 are at least partially composed of carbon fiber. Additionally or alternatively, the wings 116, the fuselage 102, the strongback 112, the tail boom 106 and/or the rudder-elevators 108 are at least partially composed of carbon fiber. In some examples, the booms 118 are rotatable (e.g., rotatable along an axis parallel to the longitudinal axis 103).

While four of the motors 120 are shown in connection with the UAV 100, any appropriate number of the motors 120 can be implemented instead (e.g., six, ten, twenty, one hundred, etc.). Further, in this example, the longitudinal axis 103 also represents a direction of travel of the UAV 100. In other examples, the longitudinal axis 103 is different from the direction of travel of the UAV 100.

Figure 2:
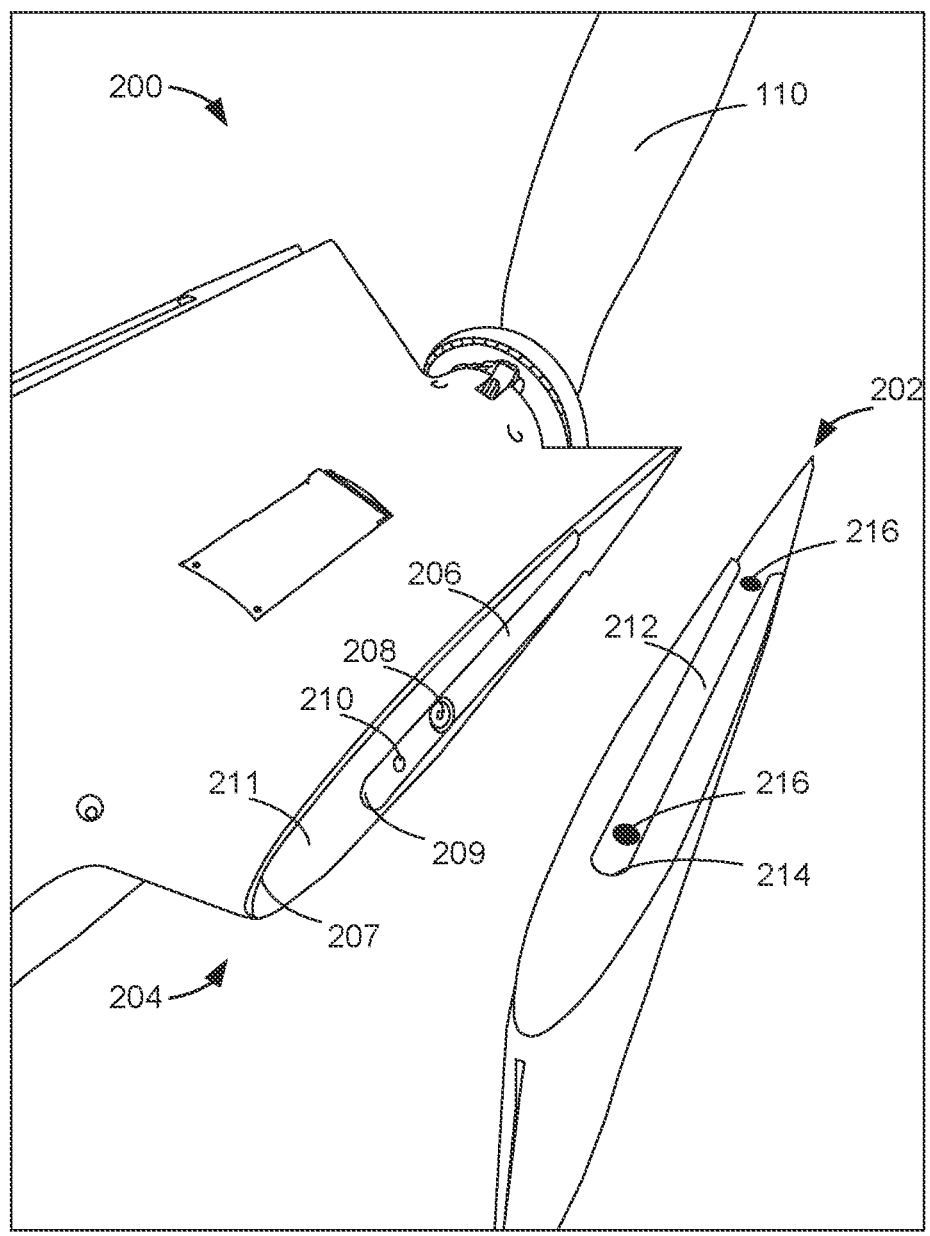
FIG. 2 depicts an example connection system in accordance with teachings of this disclosure.

FIG. 2 depicts an example connection system 200 in accordance with teachings of this disclosure. In the illustrated example, an aerodynamic body 202, which may be implemented as the rudder-elevator 108 and/or the wing 116, is being releasably coupled to a frame 204, which may be part of the fuselage 102 and/or the tail boom 106 shown in FIG. 1.

The example frame 204 supports and/or positions the motor 110. In this example, the frame 204 includes a tab (e.g., a dove-shaped tab, an oval shaped tab, etc.) 206 that is supported on a surface 207. The example tab 206 has a generally oblong or oval shape (e.g., an oblong oval body) and has a rounded distal end 209, and a coupler 208 to couple the tab 206 to the frame 204. Further, the tab 206 includes an aperture 210 to receive a lock pin. The tab 206 extends from and/or is coupled to a base 211 that is coupled to and/or integral with the aforementioned surface 207.

The aerodynamic body 202 supports at least one aerodynamic surface of the UAV 100. The aerodynamic body 202 includes a slot 212, which is complementarily shaped to the tab 206 and is implemented as an indentation, groove and/or scallop of the aerodynamic body 202. The example slot 212 includes a curved distal end 214 and openings or apertures 216.

To releasably couple the aerodynamic body 202 to the frame 204, the tab 206 is aligned with and inserted into the slot 212. In this example, the tab 206 and the slot 212 are shaped and oriented so that the insertion of the tab 206 into the slot 212 is guided to maintain a requisite degree of alignment between the aerodynamic body 202 and the frame 204. In this example, the insertional motion of the tab 206 is within 5 degrees of a direction opposite a direction of travel of the UAV 100 so that pressure acting on the aerodynamic body 202 during flight of the UAV 100 aids in securing the aerodynamic body 202 to the frame 204. In other words, a direction of insertion of the tab 206 facilitates the aerodynamic body 202 being secured to the frame 204. Further, the example tab 206 includes a dovetail shape to facilitate insertion and alignment thereof to the slot 212. In other examples, however, the aerodynamic body 202 includes a tab while the frame 204 includes a slot.

Figure 3B:
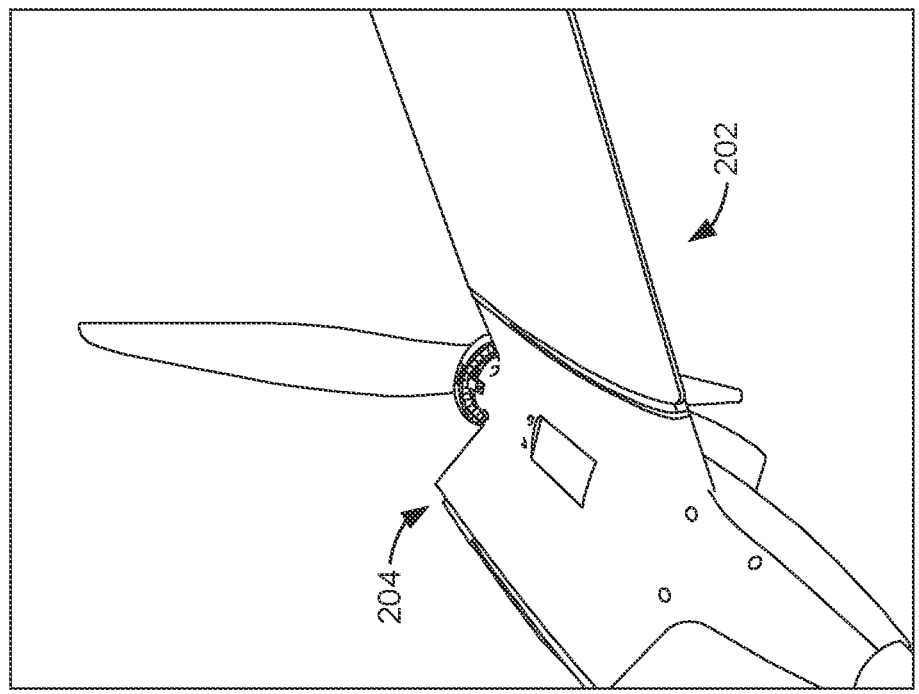
FIGS. 3A and 3B depict steps of an example coupling process in accordance with teachings of this disclosure.
Figure 3A:
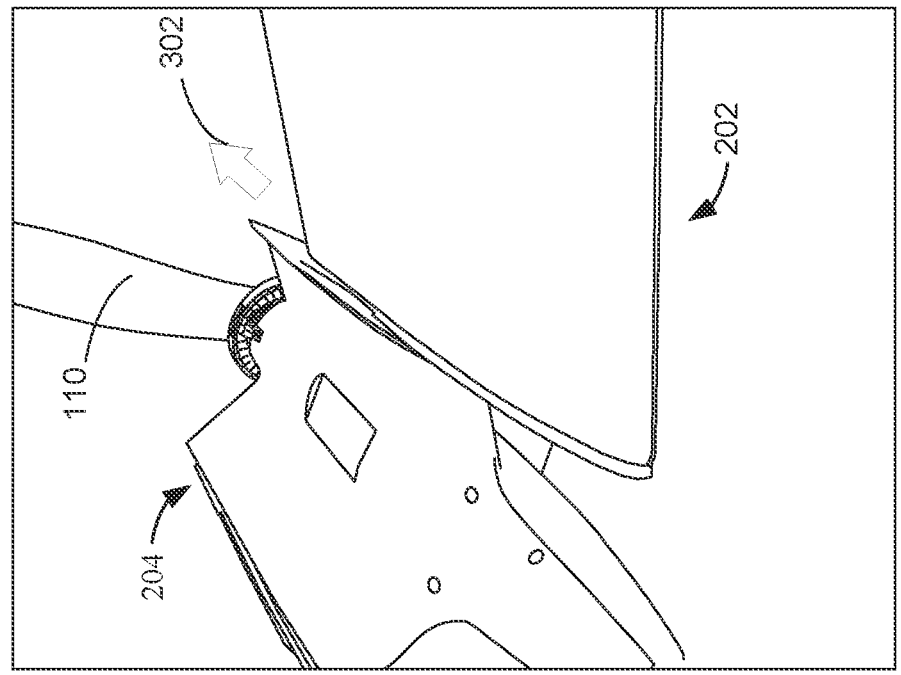

FIGS. 3A and 3B depict steps of an example coupling process in accordance with teachings of this disclosure. Turning to FIG. 3A, the aerodynamic body 202 is shown being moved toward the motor 110 in a direction generally indicated by an arrow 302 as the aerodynamic body 202 is being releasably coupled to the frame 204. In this example, a direction of the arrow 302 is associated with a direction that is opposite of a direction of travel of the UAV 100.

FIG. 3B depicts the aerodynamic body 202 being fully coupled to the frame 204. As will be discussed in greater detail below in connection with FIG. 8B, a locking mechanism or device can be implemented to further secure the aerodynamic body 202 to the frame 204. In particular, a locking pin (e.g., a spring-loaded locking pin), a snap, a lever, a locking arm, etc. can be implemented to secure the aerodynamic body 202 to the frame 204.

Figure 4:
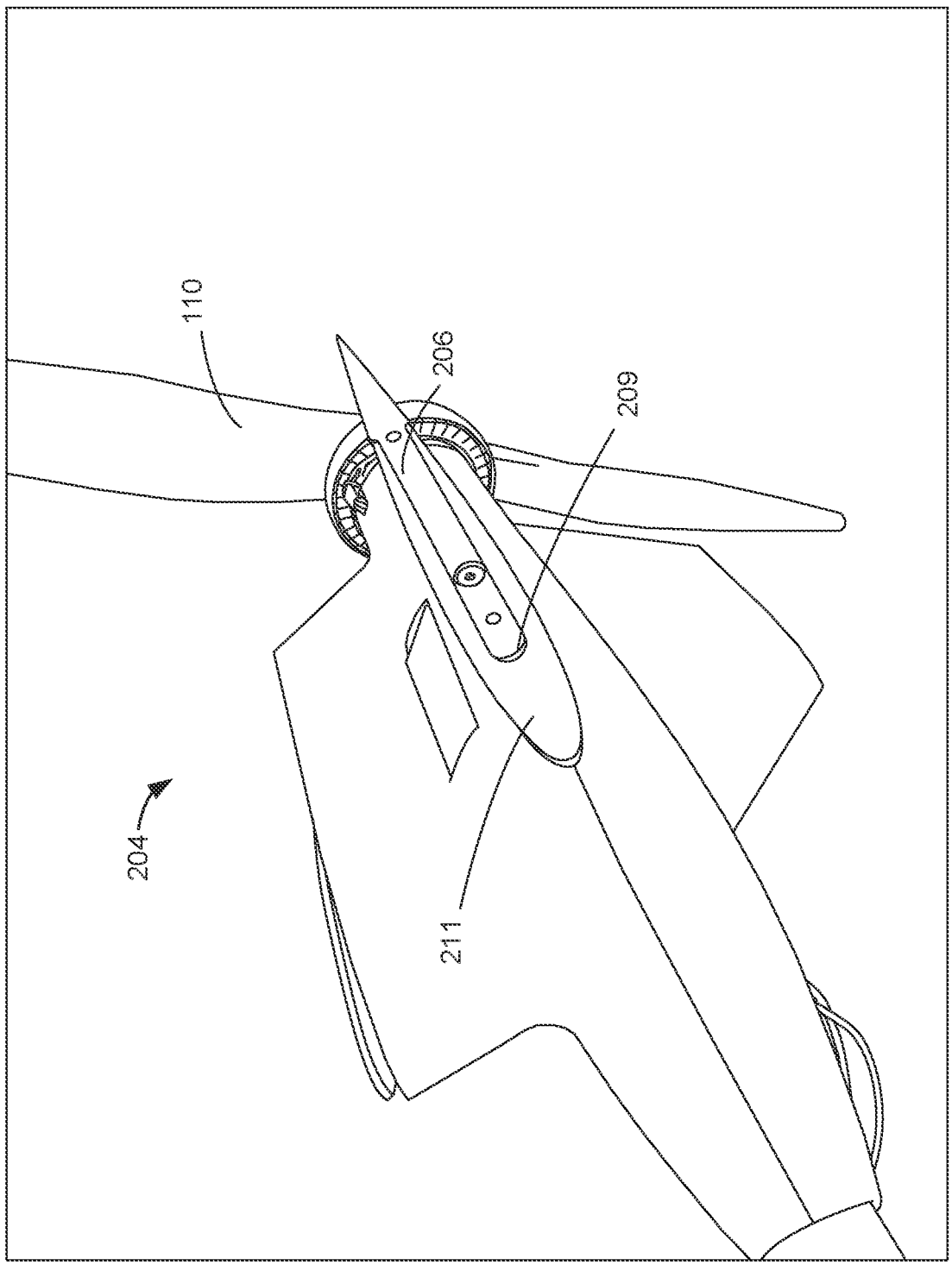
FIG. 4 is a detailed view of an example frame of the connection system shown FIGS. 2-3B.

FIG. 4 is a detailed view of the example frame 204 of the connection system 200 shown FIGS. 2-3B. In the illustrated view of FIG. 4, the tab 206 extends away from the base 211. Further, the distal end 209 is shown with curvature in multiple directions (e.g., a three-dimensional curvature). Moreover, the distal end 209 is angled away from the base 211.

Figure 5A:
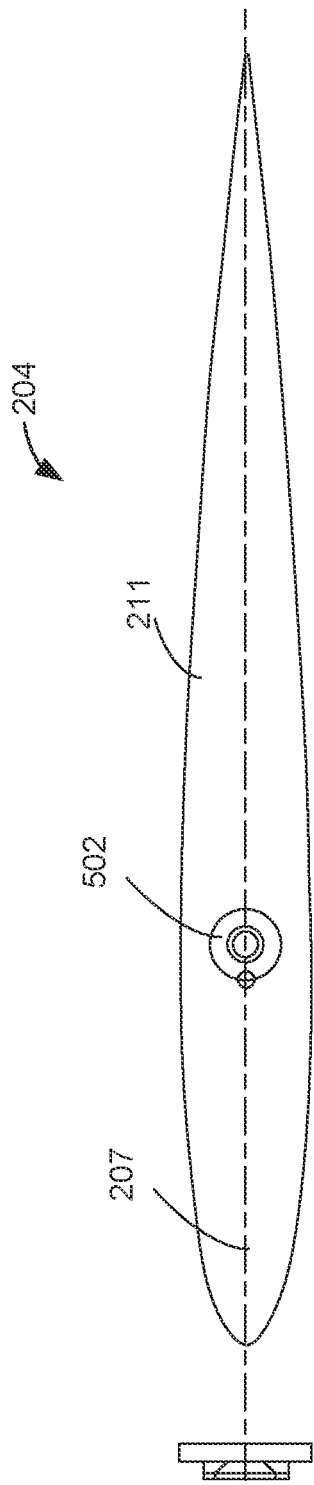
FIGS. 5A and 5B are detailed views of the example frame of the example connection system of FIGS. 2-4.
Figure 5B:
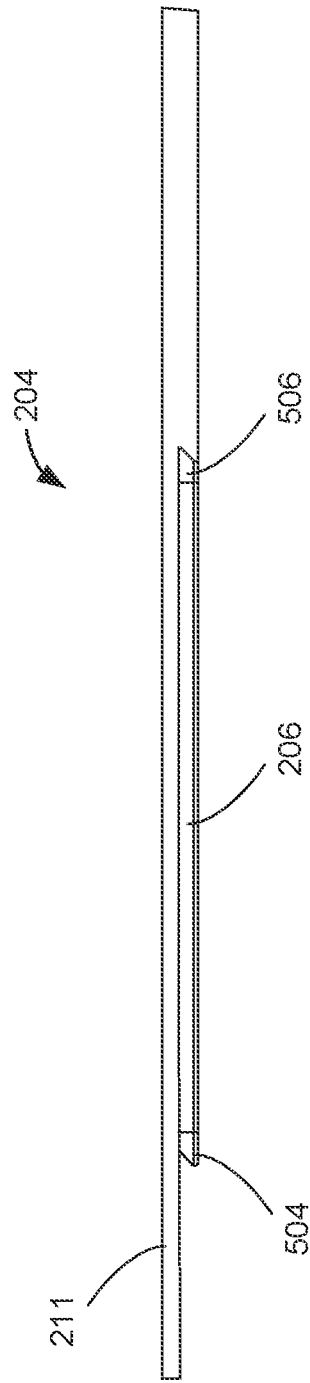

FIGS. 5A and 5B are detailed views of the example frame 204 of the example connection system of FIGS. 2-4. Turning to FIG. 5A, the surface 207 is shown having a coupling point 502 to secure the base 211 to the tab 206. The base 211 can be secured to the tab 206 with any appropriate coupling including, but not limited to a mechanical fastener, a chemical fastener, a bond, a weld, etc.

FIG. 5B is a side view of a portion of the frame 204. In the illustrated example, the base 211 is shown with the tab 206. As can be seen in FIG. 5, the tab 206 includes an indentation 504 and a ramped surface 506 to facilitate alignment and insertion of the tab 206 into the slot 212.

Figure 6A:
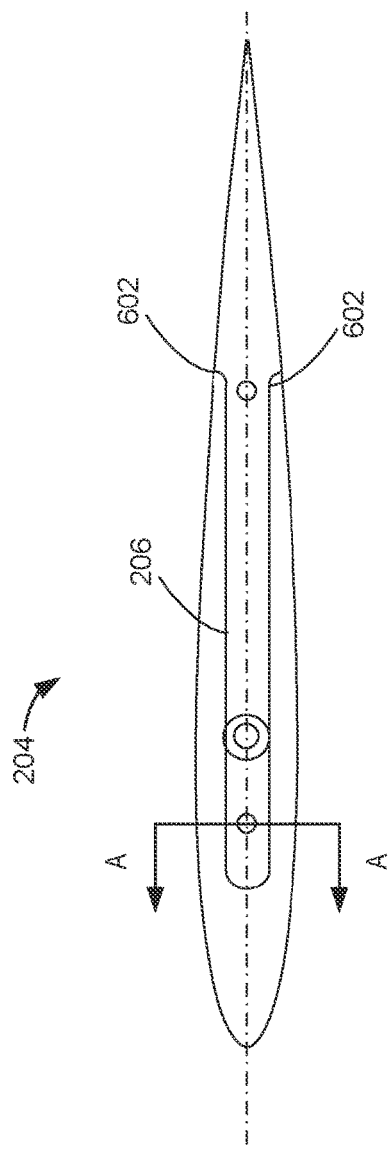
FIGS. 6A and 6B are additional detailed views of the example connection system of FIGS. 2-5B.
Figure 6B:
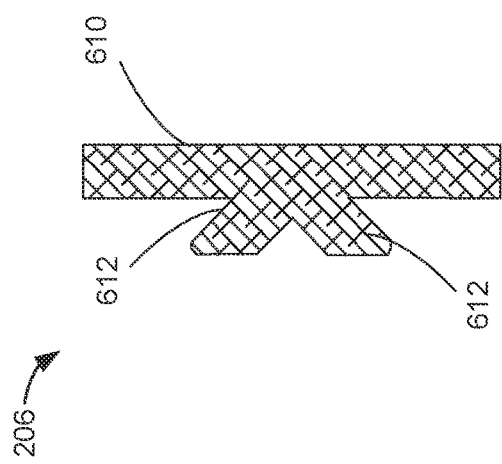

FIGS. 6A and 6B are additional detailed views of the example frame 204 of the connection system 200 of FIGS. 2-5B. FIG. 6A is a detailed view of the tab 206. In this example, the tab 206 includes rounds 602 to facilitate a relatively close fit of the tab 206 relative to the slot 212 (not shown) when the aerodynamic body 202 (not shown) is coupled to the frame 204.

Turning to FIG. 6B, a detailed cross-sectional view corresponding to A-A of FIG. 6A is shown. In particular, a cross-sectional profile of the tab 206 is shown. In this example, a base 610 is shown with angled arms (e.g., vertical arms) 612. In this example, the arms 612 are angled at approximately 90 degrees from one another. However, any appropriate angular spacing can be implemented instead.

Figure 7A:
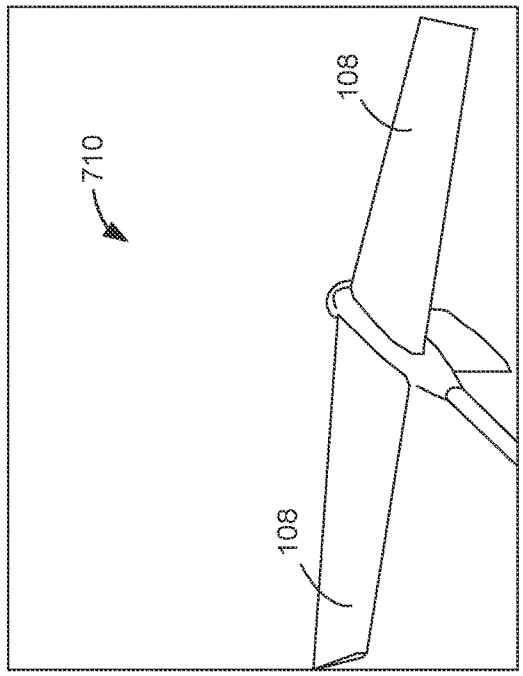
FIGS. 7A-7D depict example rudder-elevator arrangements that can be implemented in examples disclosed herein.

FIGS. 7A-7D depict example rudder-elevator arrangements 700, 710, 720, 730 that can be implemented in examples disclosed herein. FIG. 7A depicts the rudder-elevator arrangement 700 that is implemented on the UAV 100. In this example, the rudder-elevators 108 are angled from one another at an angle less than 180 degrees (e.g., 60 degrees, 90 degrees, 100 degrees, 120 degrees, 135 degrees, etc.).

Figure 7B:
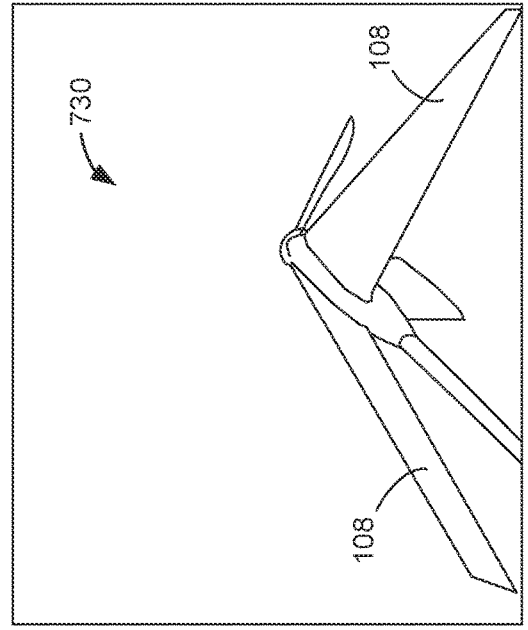

FIG. 7B depicts the example rudder-elevator arrangement 710. In the illustrated example, the rudder-elevators 108 are spaced 180 degrees apart from one another. In this example, the rudder-elevators 108 are relatively parallel to the ground. However, the rudder-elevators 108 can be angled from the ground.

Figure 7C:
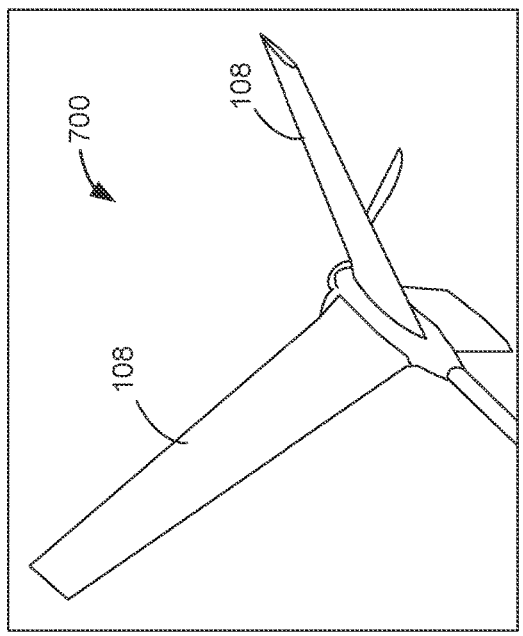

FIG. 7C depicts the example rudder-elevator arrangement 720. In this example, the rudder-elevators 108 are arranged horizontally, but a vertical stabilizer 722 is implemented.

Figure 7D:
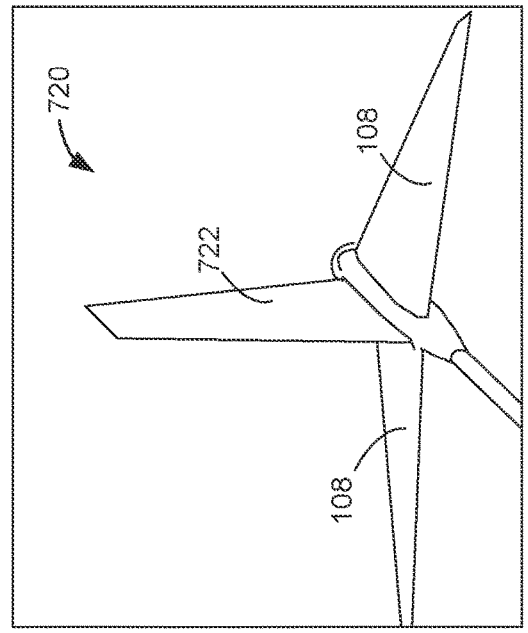

FIG. 7D depicts the example rudder-arrangement 730, which is similar to the rudder arrangement 700 of FIG. 7A but, instead, includes the rudder-elevators 108 oriented downward toward the ground instead of upward and away from the ground.

Figure 8B:
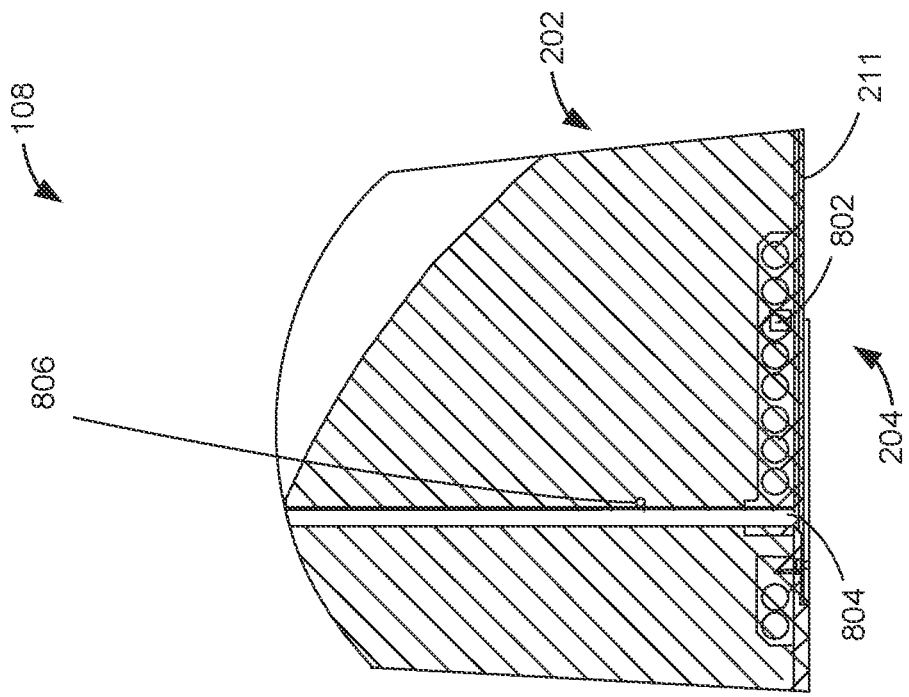
FIGS. 8A and 8B depict an assembled rudder-elevator in an assembled state.
Figure 8A:
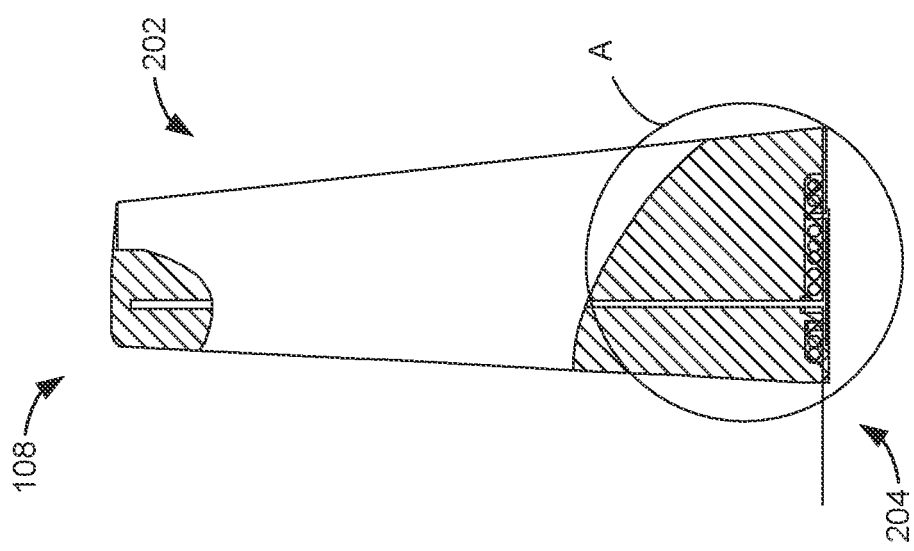

FIGS. 8A and 8B depict the example rudder-elevator 108 in an assembled state. Turning to FIG. 8A, the aerodynamic body 202 is implemented as the rudder-elevator 108 and releasably coupled to the frame 204.

FIG. 8B is a detailed view corresponding to region A of FIG. 8A. In the illustrated example, the rudder-elevator 108 is coupled to the base 211. In this example, a spring plunger (e.g., an AISI 304 plunger) 802 is shown with a lock pin (e.g., a spring-loaded pin, a locking pin, a spring pin, a passivated 18-8 CRES pin, etc.) 804 that is captured, positioned and/or aligned by a spar 806, which may be at least partially composed of carbon fiber.

In this example, the lock pin 804 extends from the rudder-elevator 108 and is to be received by an aperture of the base 211 and/or the frame 204 to secure the rudder-elevator 108 and/or the aerodynamic body 202 to the frame 204. As a result, the rudder-elevator 108 and/or the aerodynamic body 202 is locked to the frame 204, thereby preventing the rudder-elevator 108 from falling from (e.g., during flight of the UAV 100) or being unintentionally removed from the frame 204.

Figure 9:
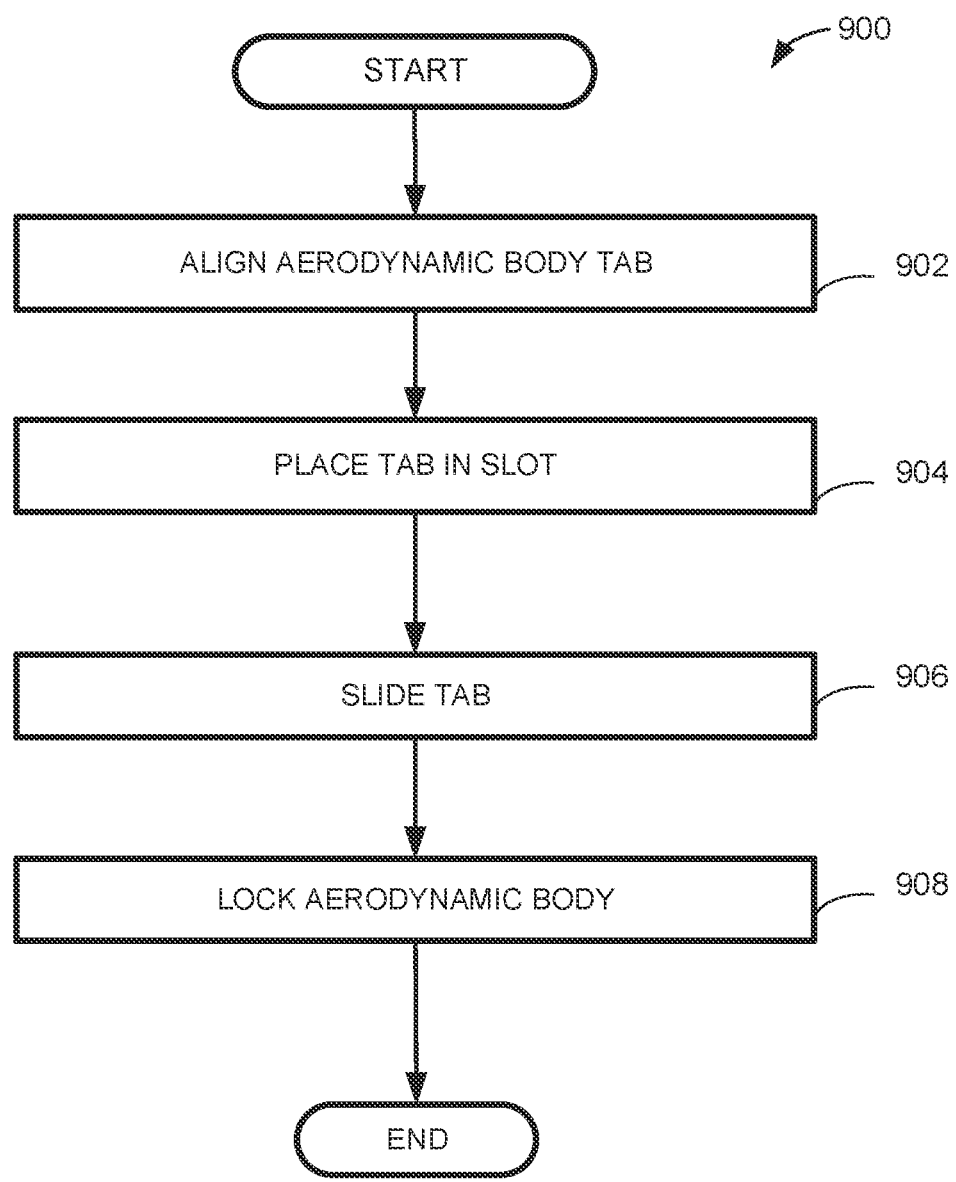
FIG. 9 is a flowchart representative of an example method to implement the example connection system of FIGS. 2-8B.

FIG. 9 is a flowchart representative of an example method 900 to implement the example connection system of FIGS. 2-8B. The method 900 begins as the aerodynamic body 202, which is the rudder-elevator 108 in this example, is being attached and/or coupled to the frame 204.

At block 902, the tab 206 of the aerodynamic body 202 is aligned with the slot 212 of the frame 204. Further, in this example, the tab 206 and the slot 212 define a slip fit. In other examples, the tab 206 and the slot 212 define a friction fit. In this example, the tab 206 is generally dove-tailed with curved surfaces to interface with curved surfaces of the slot 212.

At block 904, in the illustrated example, the tab 206 is placed in the slot 212 after the tab 206 is aligned to the slot 212.

At block 906, the aerodynamic body 202 and/or the tab 206 is slid relative to the frame 204. In this example, the tab 206 is inserted and slid in a direction of motion within 5 degrees of a direction that is opposite a direction of travel of the UAV 100, thereby enabling pressure encountered by the UAV 100 during flight to further secure the aerodynamic body 202 to the frame 204. In some examples, the tab 206 is spring-loaded to provide an additional retention force between the aerodynamic body 202 and the frame 204.

At block 908, the aerodynamic body 202 is locked to the frame 204 and the process ends. In the illustrated example, a lock pin, such as the lock pin 804 shown in FIG. 8B, is utilized to lock the aerodynamic body 202 to the frame 204.

Example 1 includes a connection system for use with a UAV. The connection system includes a tab extending from one of an aerodynamic body or a frame, and a slot to receive the tab, the slot positioned on another of the aerodynamic body or the frame, the tab to be inserted into the slot in a direction that is opposite to a direction of travel of the UAV.

Example 2 includes the connection system as defined in example 1, further including a lock pin to extend into the tab or the slot.

Example 3 includes the connection system as defined in example 2, wherein the lock pin is spring-loaded.

Example 4 includes the connection system as defined in any of examples 1 to 3, wherein the tab is dovetail shaped.

Example 5 includes the connection system as defined in any of examples 1 to 4, wherein the aerodynamic body is a wing.

Example 6 includes the connection system as defined in any of examples 1 to 4, wherein the aerodynamic body is a combined rudder-elevator.

Example 7 includes the connection system as defined in example 6, wherein the combined rudder-elevator swivels relative to the frame.

Example 8 includes the connection system as defined in any of examples 1 to 7, wherein the tab is angled from a base of the frame.

Example 9 includes the connection system as defined in any of examples 1 to 8, wherein the tab includes an oblong oval shape.

Example 10 includes a method for coupling an aerodynamic body to a frame of a UAV. The method includes aligning a tab extending from one of the aerodynamic body or the frame to a slot positioned on another of the aerodynamic body or the frame, placing the tab in the slot, and sliding the tab along the slot in a direction that is opposite to a direction of travel of the UAV to couple the aerodynamic body to the frame.

Example 11 includes the method as defined in example 10, further including locking the aerodynamic body to the frame.

Example 12 includes the method as defined in example 11, wherein the aerodynamic body is locked to a frame via a lock pin.

Example 13 includes the method as defined in example 12, wherein the lock pin is spring-loaded.

Example 14 includes the method as defined in any of examples 10 to 13, wherein the tab is angled from a base of the frame.

Example 15 includes the method as defined in any of examples 10 to 14, wherein the aligning the tab includes placing an oblong oval body of the tab into a slot that is complementarily shaped to the oblong oval body.

Example 16 includes a connector for use with a UAV. The connector includes an oblong oval body on one of an aerodynamic body or a frame of the UAV, the oblong oval body to be received by a slot positioned on another of the aerodynamic body or the frame, the oblong oval body to be inserted into the slot in a direction that is opposite to a direction of travel of the UAV.

Example 17 includes the connector as defined in example 16, wherein the oblong oval body has a dovetail shape.

Example 18 includes the connector as defined in any of examples 16 or 17, wherein the oblong oval body has a rounded curve at a distal end of the oblong oval body.

Example 19 includes the connector as defined in any of examples 16 to 18, further including an aperture to receive a lock pin.

Example 20 includes the connector as defined in example 19, wherein the lock pin is spring-loaded.

From the foregoing, it will be appreciated that example methods, apparatus and articles of manufacture have been disclosed that enable modular connection of aircraft components. Examples disclosed herein are cost effective and enable different parts to be interchanged. Further, example component connections disclosed herein are strengthened by pressure acting on an aircraft during flight.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A connection system for use with an aerial vehicle (AV), the connection system comprising:
    a tab extending from one of an aerodynamic body or a frame of the AV, the tab having a dove-tailed cross-sectional profile including:
        a narrow portion extending from the aerodynamic body or the frame at a first side of the tab, and
        a wider portion at a distal end of the tab, the wider portion defining a flat surface at the distal end, the flat surface including an aperture to receive a lock pin, the flat surface at a second side of the tab that is opposite the first side; and
    a slot to receive the tab, the slot positioned on the other of the aerodynamic body or the frame, the aerodynamic body moved relative to the frame along a direction that is opposite a forward direction of travel of the AV as the tab is inserted into the slot.

2. The connection system as defined in claim 1, further including the lock pin.

3. The connection system as defined in claim 2, wherein the lock pin is spring-loaded.

4. The connection system as defined in claim 1, wherein the aerodynamic body is a wing.

5. The connection system as defined in claim 1, wherein the aerodynamic body is a combined rudder-elevator.

6. The connection system as defined in claim 5, wherein a portion of the combined rudder-elevator swivels relative to the frame.

7. The connection system as defined in claim 1, wherein the tab is angled from a base of the frame.

8. The connection system as defined in claim 1, wherein the tab includes an oblong oval shape.

9. A method for coupling an aerodynamic body to a frame of an aerial vehicle (AV), the method comprising:
    aligning a tab extending from one of the aerodynamic body or the frame to a slot positioned on another of the aerodynamic body or the frame, the tab having a dove-tailed cross-sectional profile including:

a narrow portion extending from the aerodynamic body or the frame at a first side of the tab, and a wider portion at a distal end of the tab, the wider portion defining a flat surface at the distal end, the flat surface including an aperture to receive a lock pin, the flat surface at a second side of the tab that is opposite the first side;

placing the tab in the slot; and sliding the tab along the slot such that the aerodynamic body is to be moved relative to the frame in a direction that is opposite a forward direction of travel of the AV to couple the aerodynamic body to the frame.

10. The method as defined in claim 9, further including locking the aerodynamic body to the frame via the lock pin.

11. The method as defined in claim 9, wherein the lock pin is spring-loaded.

12. The method as defined in claim 9, wherein the tab is angled from a base of the frame.

13. The method as defined in claim 9, wherein the aligning the tab to the slot includes placing an oblong oval body of the tab into the slot that is complementarily shaped to the oblong oval body.

14. A connector for use with an aerial vehicle (AV), the connector comprising:

an oblong oval body on one of an aerodynamic body or a frame of the AV, the oblong oval body to be received by a slot positioned on another of the aerodynamic body or the frame, the oblong oval body to be inserted into the slot such that the aerodynamic body is moved relative to the frame in a direction that is opposite a forward direction of travel of the AV, the oblong oval body having a dove-tailed cross-sectional profile including:

a narrow portion extending from the aerodynamic body or the frame at a first side of the tab, and a wider portion at a distal end of the oblong oval body, the wider portion defining a flat surface at the distal end, the flat surface including an aperture to receive a lock pin, the flat surface at a second side of the tab that is opposite the first side.

15. The connector as defined in claim 14, wherein the oblong oval body has a rounded curve at an aft end of the oblong oval body.

16. The connector as defined in claim 14, further including a second aperture to receive a second lock pin.

17. The connector as defined in claim 14, wherein the lock pin is spring-loaded.

18. The connection system as defined in claim 1, wherein the tab includes a rounded curve at an aft end thereof.

19. The connection system as defined in claim 1, wherein the tab includes a lead-in indentation at a fore end thereof.

20. The connection system as defined in claim 19, wherein the lead-in indentation converges to the narrow portion of the dove-tailed cross-sectional profile.

* * * * *